United States Patent

[11] 3,601,502

| [72] | Inventor | Robert M. Harter<br>Collins, N.Y. |
|---|---|---|
| [21] | Appl. No. | 858,699 |
| [22] | Filed | Sept. 17, 1969 |
| [45] | Patented | Aug. 24, 1971 |
| [73] | Assignee | General Motors Corporation<br>Detroit, Mich. |

[54] VIBRATION ISOLATION BLOWER MOUNTING
4 Claims, 2 Drawing Figs.

[52] U.S. Cl............................................... 416/244,
248/15
[51] Int. Cl............................................... B64c 11/00
[50] Field of Search........................................... 248/15, 8
C, 9 C, 17, 26, 27 C; 416/244, 170

[56] References Cited
UNITED STATES PATENTS

| 2,020,092 | 11/1935 | Allen............................ | 248/26 |
| 2,301,818 | 11/1942 | Sackett......................... | 248/26 |
| 2,647,591 | 8/1953 | Young........................... | 248/18 X |
| 2,773,973 | 12/1956 | Hoard et al.................. | 248/27 X |
| 3,145,910 | 8/1964 | Jolly............................. | 248/18 X |
| 3,317,124 | 5/1967 | Morrill.......................... | 248/18 X |
| 3,508,729 | 4/1970 | Wilson.......................... | 248/27 X |

FOREIGN PATENTS

| 1,099,602 | 3/1955 | France......................... | 248/18 |

*Primary Examiner*—Everette A. Powell, Jr.
*Attorneys*—William S. Pettigrew and J. C. Evans ABSTRACT: In preferred form a blower assembly for an automobile ventilation system including a blower motor, a blower fan connected to the motor for rotation, a resilient plastic member having a tubular end portion encircling and supporting the fan and a bellows portion connected at one end to the tubular end portion and attached at the other end to a wall of the automobile. Expansion and contraction of the bellows portion dampens axial and lateral vibrational movement of the blower motor.

PATENTED AUG 24 1971  3,601,502

INVENTOR.
Robert M. Harter
BY
J.C. Evans
ATTORNEY

VIBRATION ISOLATION BLOWER MOUNTING

This invention relates to a blower assembly for automobile ventilation systems and more particularly to a vibration dampening blower motor mount.

In previous automobile ventilation systems, blower motors have been attached directly to walls of the automobile or an air duct. Direct attachment of the blower motor is undesirable because vibrations are then easily transferred to the passenger compartment through the air duct and the walls. These vibrations are the cause of much objectionable noise. They may also loosen fastening means which is a subsequent source of rattles. A less serious but still significant disadvantage of direct attachment to the automobile is the jarring of the blower motor produced by road shock. These road shocks and resultant shaking of the blower motor may cause motor connections to loosen.

The motor mount on the present application produces a vibration dampening support for the electric blower motor. The mount is blow molded of resilient plastic material. A tubular portion of the mount is adapted to encircle, to support and to protect the blower motor. An accordion-walled bellows portion expands and contracts to dampen axial and lateral vibrational movement of the blower motor. This significantly reduces the transmittal of vibration to the air duct.

Therefore, an object of the inventor is to provide a blower assembly for an automobile ventilation system including a mount for an electric blower motor which dampens axial and lateral vibrational movement of the motor and prevents transmittal of vibration to the automobile.

A still further object of the inventor is to provide a blower assembly for an automobile ventilation system including a motor mount having a tubular end portion which encircles the motor to support and protect it.

A still further object of the inventor is to provide a blower assembly for an automobile ventilation system including a one piece, blow molded motor mount of resilient plastic material.

Further objects and advantages of the present invention will be apparent from the following description, reference being had to the accompanying drawing wherein the preferred embodiment of the present invention is clearly shown.

In the drawings

Figure 1:
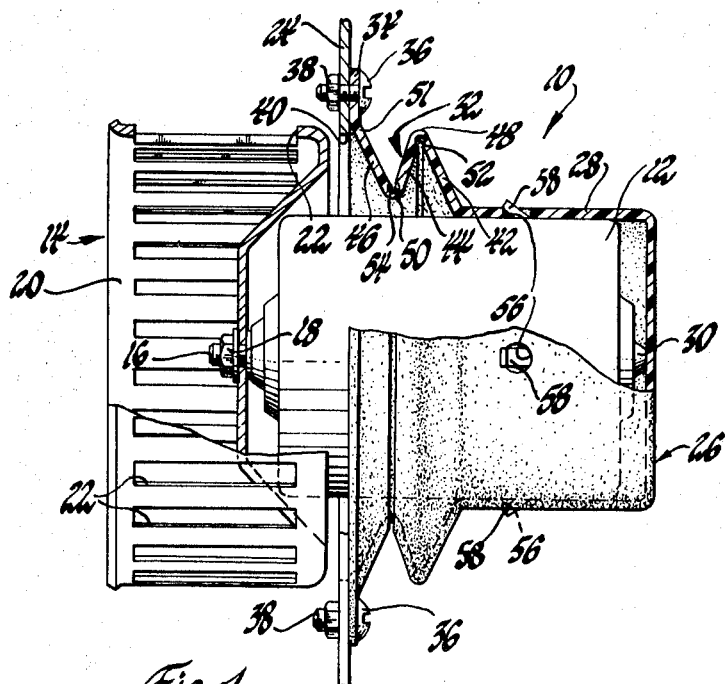
FIG. 1 is a vertical view partially in section of the subject blower assembly illustrating the motor mount.
Figure 2:
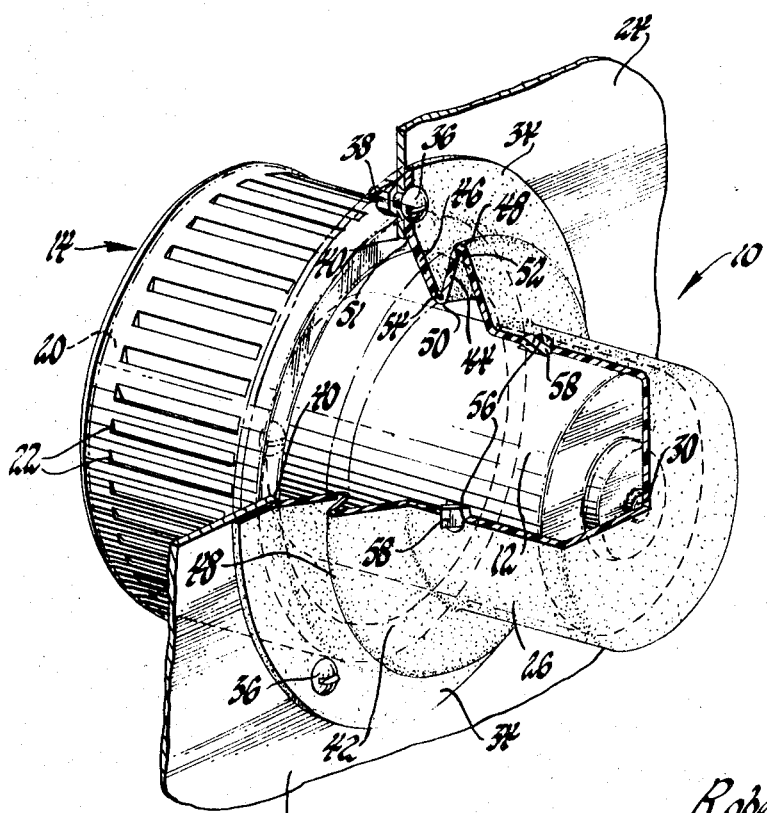
FIG. 2 is a perspective view of the subject blower assembly with the motor mount broken away to better reveal its tubular configuration.

In FIG. 1 of the drawings, a blower assembly 10 including a small electric motor 12 and a squirrel cage blower fan 14 is illustrated. Fan 14 is fastened to drive shaft 16 of motor 12 by a nut 18 which is threaded on the shaft 16. Fan 14 is of a conventional design and includes an axial inlet 20 and a plurality of outlets 22 on the peripheral surface of the fan. Motor 12 and fan 14 are supported relative to a fixed wall of the automobile such as duct wall 24 by a mount 26. Mount 26 includes a tubular end portion 28 which is adapted to encircle and grasp the motor 12. An axially projecting end portion 30 on motor 12 engages portion 28 to axially position the motor 12 in mounting member 26. In addition to supporting the motor 12, the end portion 28 protects it from damage.

An accordian-walled bellows portion 32 is integrally connected at one end to the end portion 28 off mount 26. A radially outwardly directed flange 34 is integrally connected to the other end of bellows portion 32. Flange 34 is attached to the duct wall 24 by a plurality of screws 36 and nuts 38. Motor 12 projects through an opening 40 in duct wall 24.

More particularly, the bellows portion 32 includes truncated conical surfaces 42, 44 and 46 which are integrally connected in series. Surface 42 extends from its connection with end portion 28 radially outward at an oblique angle to the axis of mount 26. Surface 44 extends radially inward at an oblique angle with respect to the axis of mount 26 from its connection with surface 42. The connection of surface 44 to surface 42 is by a hinge 48. Surface 46 extends radially outward at an oblique angle with respect to the axis of member 26 from its connection with surface 44. The connection of surface 46 to surface 48 is by a hinge 50. Flange 34 is integrally connected to surface 46 at 51.

Hinges 48 and 50 are the connections between the surfaces 42, 44 and 46. Hinge 48 is thinner than the thickness of adjacent surfaces 42 and 44 because of a molded annular recess 52. Likewise, hinge 50 which connects surfaces 44 and 46 is thinner than adjoining surfaces 44 and 46 because of a recess 54. Recesses 52 and 54 reduce the cross-sectional area of the connection between adjoining surfaces 42, 44 and 46 to facilitate relative movement between the surfaces. This freedom of movement produces a dampening spring support for motor 12 and fan 14.

More particularly, axial vibrational movement of the motor 12 causes surfaces 42, 44, and 46 to alternately move closer together and further apart. The bending of material at hinges 48 and 50 dissipates energy and consequently dampens vibration. Lateral movement of motor 12 also causes surfaces 42, 44 and 46 to move with respect to each other. The resultant bending of material at hinges 48 and 50 dissipates energy and dampens the movement of motor 12. This prevents the transmittal of vibrations to duct wall 24.

To prevent the motor 12 from axially moving in tubular end portion 28, tabs 58 on motor 12 are adapted to coact with bores 56 in the portion 28. Motor 12 and mount 26 are joined by slipping the tubular end portion 28 over the motor until tabs 58 project through bores 56.

While the embodiment of the present invention as herein described constitutes a preferred form, it is to be understood that other forms may be adapted.

What is claimed is as follows:

1. A blower assembly for an automobile ventilation system comprising an electric motor; a fan operably connected to said motor for rotation; a one piece motor mount of resilient plastic material for supporting said motor; said mount including a tubular end portion adapted to encircle said motor; an accordion-walled bellows portion of said mount integrally connected at one end to said tubular end portion; means connected to the other end of said bellows portion for attaching said mount to the automobile; said bellows portion including a plurality of surfaces which are serially integrally connected at adjacent edges and which alternately extend radially outwardly and radially inwardly with respect to the axis of the mount to form an expandable and contractable link between said tubular end portion and said attachment means and whereby vibrations of said motor are dampened by relative movement between said surfaces and the resultant bending of said connections between said surfaces.

2. A blower assembly as set forth in claim 1 wherein outwardly projecting tabs on said motor coact with holes in said tubular end portion to axially position said motor in said tubular end portion.

3. The blower assembly as set forth in claim 1 wherein annular recesses in said connections between surfaces of said bellows portion reduce the thickness of said connection with respect to the thickness of adjacent surfaces and whereby said connections function as relatively flexible hinges to dampen movement between surfaces of such bellows portions.

4. A vibration dampening mount for the attachment of an electric motor to a structure comprising: a one-piece mounting member of resilient plastic material for supporting the motor in relation to the structure; said member having a tubular end portion adapted to encircle the motor; an accordion-walled bellows portion integrally connected at one end to said tubular end portion; means connected to the other end of said bellows portion for attaching said member to the automobile; said bellows portion including a plurality of surfaces which are serially integrally connected at adjacent edges and which alternately extend radially outward and radially inward with respect to the axis of said member to form an expandable and contractable link between said tubular end portion and said attachment means and whereby vibrations of the motor are dampened by relative movement between said surfaces and the resultant bending of said connections between said surfaces.